(12) United States Patent
Jeong et al.

(10) Patent No.: US 12,074,342 B2
(45) Date of Patent: Aug. 27, 2024

(54) BATTERY MODULE STRUCTURED SO AS TO ALLOW ACCURATE TEMPERATURE SENSING, AND BATTERY PACK AND MOTOR VEHICLE COMPRISING SAME

(71) Applicant: LG CHEM, LTD., Seoul (KR)

(72) Inventors: Jong-Ha Jeong, Daejeon (KR);
Do-Hyun Park, Daejeon (KR);
Young-Ho Lee, Daejeon (KR);
Jung-Min Kwak, Daejeon (KR);
Jae-Hyun You, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/041,379

(22) PCT Filed: Dec. 18, 2019

(86) PCT No.: PCT/KR2019/017947
§ 371 (c)(1),
(2) Date: Sep. 24, 2020

(87) PCT Pub. No.: WO2020/138819
PCT Pub. Date: Jul. 2, 2020

(65) Prior Publication Data
US 2021/0119309 A1    Apr. 22, 2021

(30) Foreign Application Priority Data

Dec. 26, 2018    (KR) .................... 10-2018-0169966

(51) Int. Cl.
*H01M 50/507*    (2021.01)
*H01M 10/48*    (2006.01)
(Continued)

(52) U.S. Cl.
CPC ......... *H01M 50/507* (2021.01); *H01M 10/48* (2013.01); *H01M 10/482* (2013.01);
(Continued)

(58) Field of Classification Search
CPC ............. H01M 50/569; H01M 50/507; H01M 50/503; H01M 10/482; H01M 10/486; H01M 2220/20
See application file for complete search history.

(56) References Cited

U.S. PATENT DOCUMENTS

2012/0121939 A1    5/2012   Yoo
2013/0288091 A1*  10/2013  Tsubaki .................. G01K 1/14
374/185

(Continued)

FOREIGN PATENT DOCUMENTS

JP    2020-504425 A    2/2020
KR   10-2014-0130357 A   11/2014
(Continued)

OTHER PUBLICATIONS

English Machine Translation of Sa (KR 20180099438 A) (provided in Information Disclosure Statement filed by Applicant on Sep. 24, 2020) (Year: 2018).*

(Continued)

*Primary Examiner* — Matthew T Martin
*Assistant Examiner* — Ankith R Sripathi
(74) *Attorney, Agent, or Firm* — Birch, Stewart, Kolasch & Birch, LLP

(57) ABSTRACT

A battery module includes a cell stack formed by stacking a plurality of battery cells; a bus bar frame assembly including a bus bar frame configured to cover one longitudinal end and the other longitudinal end of the cell stack and a plurality of bus bars fixed on the bus bar frame and electrically connected to the battery cells; and a FPCB assembly including (Continued)

a first FPCB extending along a longitudinal direction of the cell stack to cover at least a portion of an upper surface of the cell stack, a second FPCB extending from both longitudinal ends of the first FPCB and electrically connected to the bus bars, and a pair of temperature sensors mounted to both longitudinal ends of the first FPCB.

14 Claims, 8 Drawing Sheets

(51) Int. Cl.
    *H01M 50/105* (2021.01)
    *H01M 50/211* (2021.01)
    *H01M 50/271* (2021.01)
    *H01M 50/284* (2021.01)
    *H01M 50/289* (2021.01)
    *H01M 50/50* (2021.01)
    *H01M 50/503* (2021.01)
    *H01M 50/531* (2021.01)
    *H01M 50/569* (2021.01)

(52) U.S. Cl.
    CPC ....... *H01M 10/486* (2013.01); *H01M 50/105* (2021.01); *H01M 50/211* (2021.01); *H01M 50/271* (2021.01); *H01M 50/284* (2021.01); *H01M 50/50* (2021.01); *H01M 50/503* (2021.01); *H01M 50/531* (2021.01); *H01M 50/569* (2021.01); *H01M 50/289* (2021.01); *H01M 2220/20* (2013.01)

(56) References Cited

U.S. PATENT DOCUMENTS

| | | | |
|---|---|---|---|
| 2017/0040635 A1* | 2/2017 | Choi | .................. B23K 35/0255 |
| 2017/0084899 A1* | 3/2017 | Deng | .................. H01M 50/569 |
| 2019/0348720 A1 | 11/2019 | Oh et al. | |
| 2019/0389318 A1 | 12/2019 | Lee et al. | |
| 2020/0044224 A1 | 2/2020 | Lee et al. | |

FOREIGN PATENT DOCUMENTS

| | | | | |
|---|---|---|---|---|
| KR | 10-2016-0061638 A | 6/2016 | | |
| KR | 1826895 B1 * | 2/2018 | .......... | H01M 10/482 |
| KR | 10-1872833 B1 | 6/2018 | | |
| KR | 10-1872473 B1 | 7/2018 | | |
| KR | 10-2018-0099438 A | 9/2018 | | |
| KR | 10-2018-0133698 A | 12/2018 | | |
| WO | WO 2012/075948 A1 | 6/2012 | | |
| WO | WO 2013/171560 A1 | 11/2013 | | |
| WO | WO 2018/124494 A2 | 7/2018 | | |
| WO | WO 2018/124751 A1 | 7/2018 | | |
| WO | WO 2018/159928 A1 | 9/2018 | | |

OTHER PUBLICATIONS

International Search Report for PCT/KR2019/017947 (PCT/ISA/210) mailed on Apr. 3, 2020.

Extended European Search Report for European Application No. 19902356.5, dated Sep. 28, 2021.

* cited by examiner

BATTERY MODULE STRUCTURED SO AS TO ALLOW ACCURATE TEMPERATURE SENSING, AND BATTERY PACK AND MOTOR VEHICLE COMPRISING SAME

TECHNICAL FIELD

The present application claims priority to Korean Patent Application No. 10-2018-0169966 filed on Dec. 26, 2018 in the Republic of Korea, the disclosures of which are incorporated herein by reference.

The present disclosure relates to a battery module having a structure allowing accurate temperature sensing, and a battery pack and a vehicle including the battery module, and more particularly, to a battery module having a structure allowing accurate temperature sensing, in which temperature sensors are installed at both longitudinal ends of a cell stack to allow accurate temperature sensing when sensing a temperature of the cell stack including battery cells having a long length compared to width, and a battery pack and a vehicle including the battery module.

BACKGROUND ART

It is very important to accurately measure the temperature of a battery cell located inside a battery. In particular, it is necessary to measure the maximum temperature of the battery cell. If the battery cell is overheated over a certain temperature, a problem may occur in a battery or a vehicle to which the battery is applied, which may greatly affect safety.

In a battery module to which a typical battery cell having a ratio of length to width within a certain range is applied, there is no problem wherever a temperature sensor is located. However, in the case of a battery module to which a long cell having a ratio of length to width over a certain range is applied in order to increase the capacity of the battery module while increasing the utilization of space when installed in a vehicle, the temperature deviation may be increased according to the location of the temperature sensor along the longitudinal direction.

Thus, in the case of a battery module to which the long cell is applied, it is necessary to install the temperature sensor at a location where temperature may be measured more accurately. In addition, it is required to provide a scheme to install the temperature sensor to be more closely adhered to the cell stack for accurate temperature measurement without deviating from the existing battery module structure as much as possible so as to prevent an energy density loss or productivity deterioration of the battery module caused by the installation of the temperature sensor.

DISCLOSURE

Technical Problem

The present disclosure is designed to solve the problems of the related art, and therefore the present disclosure is directed to preventing an energy density loss or productivity deterioration of a battery module while allowing more accurate measurement of temperature of battery cells included in the battery module.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a cell stack formed by stacking a plurality of battery cells; a bus bar frame assembly including a bus bar frame configured to cover a first longitudinal end and a second longitudinal end of the cell stack and a plurality of bus bars fixed on the bus bar frame and electrically connected to the battery cells; and a flexible printed circuit board (FPCB) assembly including a first FPCB extending along a longitudinal direction of the cell stack to cover at least a portion of an upper surface of the cell stack, a second FPCB extending from both longitudinal ends of the first FPCB and electrically connected to the plurality of bus bars, and a pair of temperature sensors mounted to both longitudinal ends of the first FPCB.

The battery cell may be a long cell having a ratio of length to width in a range of 3 to 12.

The first FPCB may have a temperature sensor placing portion formed by cutting a part of the first FPCB.

A first longitudinal end of the temperature sensor placing portion may be formed as a fixed end and a second longitudinal end may be formed as a free end, and both widthwise ends of the temperature sensor placing portion may be formed as free ends.

Both longitudinal ends of the temperature sensor placing portion may be formed as fixed ends, and both widthwise ends of the temperature sensor placing portion may be formed as free ends.

The battery module may further comprise an upper cover configured to cover an upper portion of the cell stack and the first FPCB.

A connection portion of the first FPCB and the second FPCB may be drawn out through a gap between the bus bar frame and the upper cover.

The battery cell may include an electrode assembly; a pair of electrode leads connected to the electrode assembly and extending in opposite directions along a longitudinal direction of the battery cell; and a cell case configured to accommodate the electrode assembly and sealed to expose the pair of electrode leads to the outside.

The pair of electrode leads may be formed at locations biased downward from a center of the cell stack in a height direction.

The battery module may further comprise a connector mounted to the second FPCB and positioned in a space formed above the electrode lead due to biasing of the electrode lead.

In another aspect of the present disclosure, there are also provided a battery pack and a vehicle, which comprises the battery module according to an embodiment of the present disclosure.

Advantageous Effects

According to an embodiment of the present disclosure, it is possible to prevent an energy density loss or productivity deterioration of a battery module while allowing more accurate measurement of temperature of battery cells included in the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

First, the overall configuration of a battery module according to an embodiment of the present disclosure will be described with reference to FIGS. 1 to 4.

Figure 1:
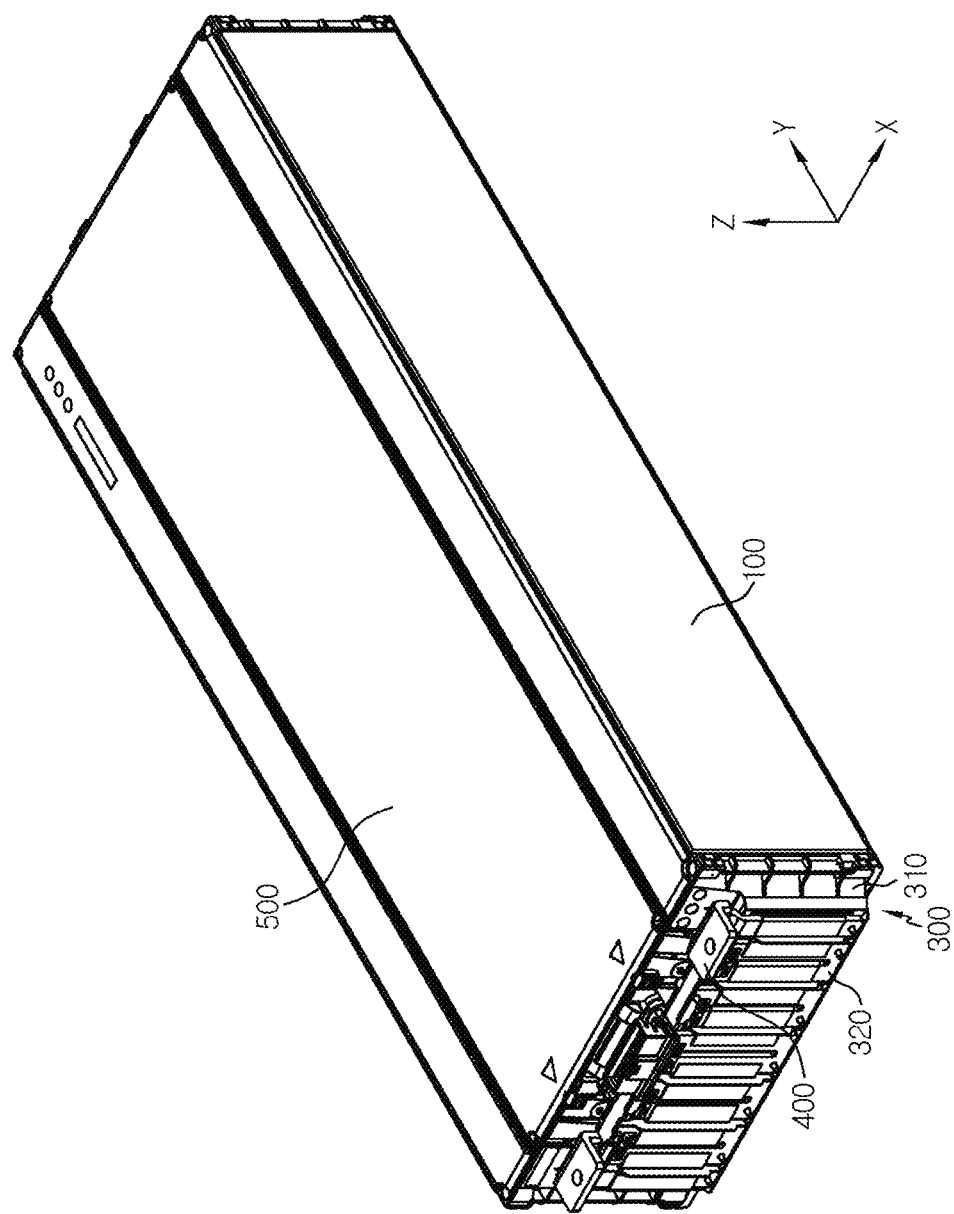
FIG. 1 is a perspective view showing a battery module according to an embodiment of the present disclosure.
Figure 2:
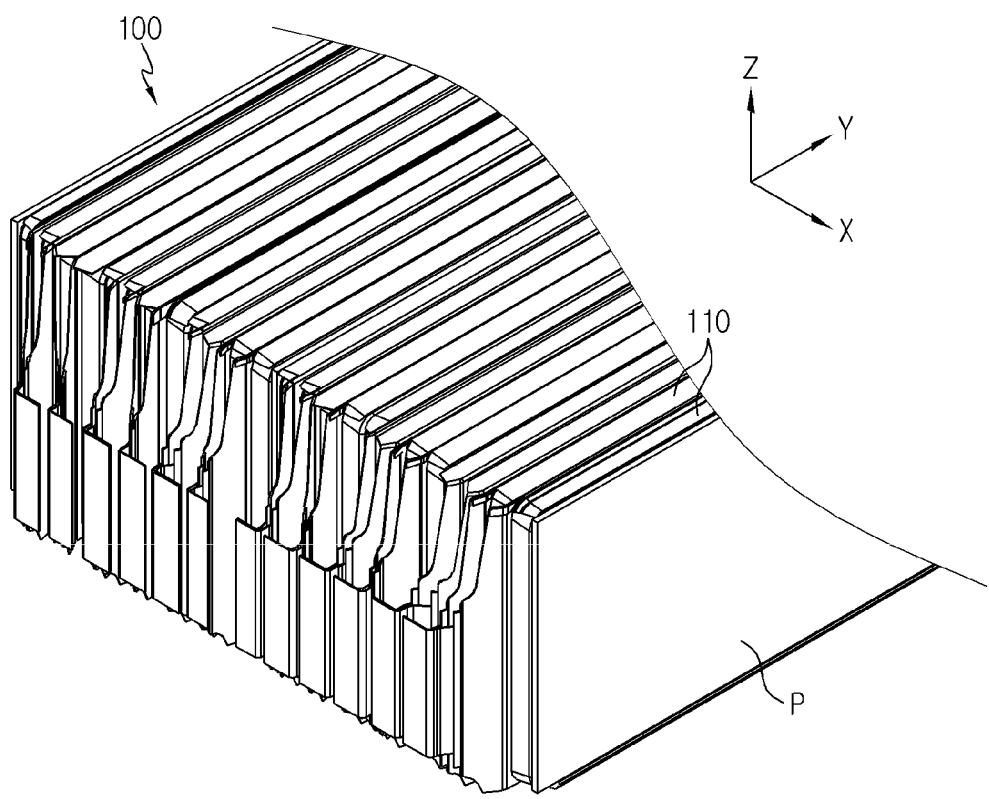
FIG. 2 is a perspective view showing a cell stack applied to the battery module according to an embodiment of the present disclosure.
Figure 3:
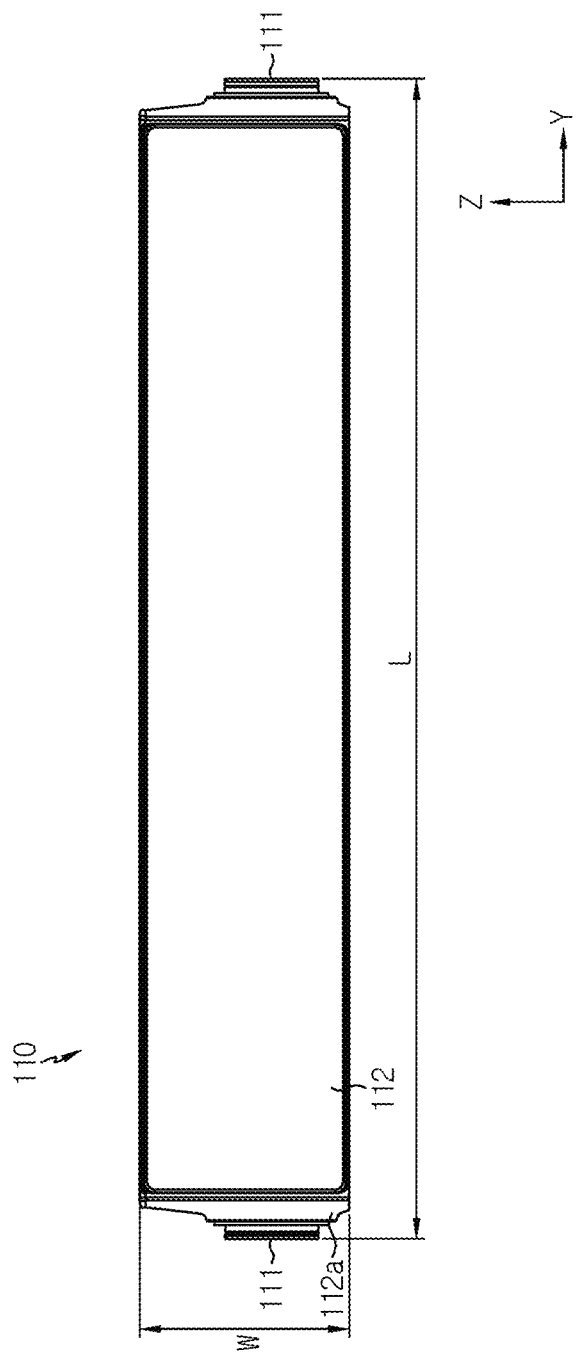
FIG. 3 is a plan view showing a battery cell applied to the battery module according to an embodiment of the present disclosure.
Figure 4:
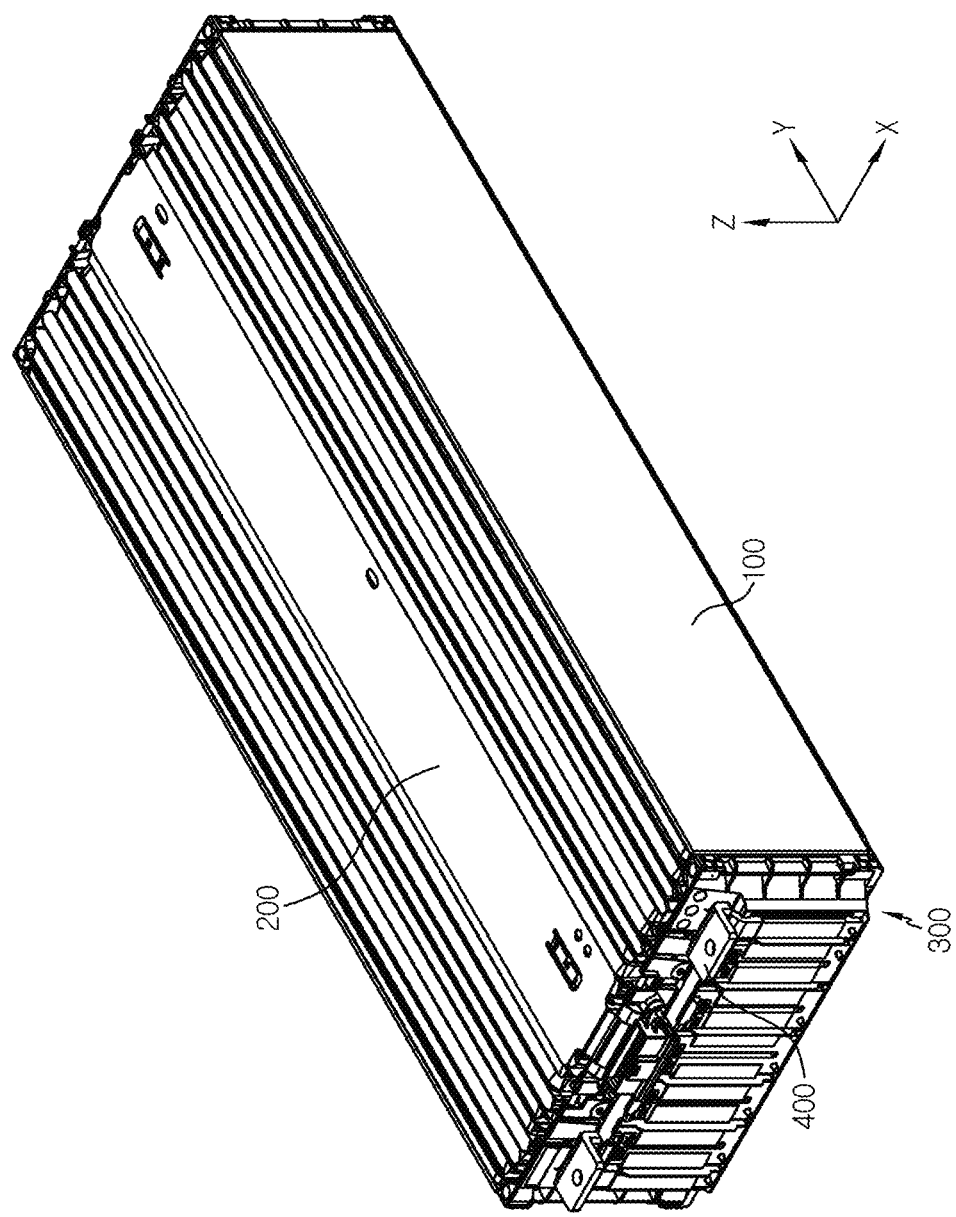
FIG. 4 is a perspective view showing the battery module according to an embodiment of the present disclosure, from which an upper cover is eliminated.

FIG. 1 is a perspective view showing a battery module according to an embodiment of the present disclosure, and FIG. 2 is a perspective view showing a cell stack applied to the battery module according to an embodiment of the present disclosure. Also, FIG. 3 is a plan view showing a battery cell applied to the battery module according to an embodiment of the present disclosure, and FIG. 4 is a perspective view showing the battery module according to an embodiment of the present disclosure, from which an upper cover is eliminated.

First, referring to FIGS. 1 to 4, a battery module according to an embodiment of the present disclosure may be implemented to include a cell stack 100, a FPCB assembly 200, a bus bar frame assembly 300, an outer terminal 400 and an upper cover 500.

The cell stack 100 includes a plurality of battery cells 110 stacked to face each other at wide surfaces thereof. The cell stack 100 may include at least one buffer pad P interposed at an outermost battery cell 110 and/or between adjacent battery cells 110.

That is, the cell stack 100 may be inserted into a mono frame (not shown) in a state of being coupled with the FPCB assembly 200, the bus bar frame assembly 300, the outer terminal 400 and the upper cover 500. At this time, in order to insert the cell stack 100 easily while securing a maximum volume of the cell stack 100, the buffer pad P made of an elastic material such as a sponge may be additionally applied.

A pouch-type battery cell may be applied as the battery cell 110. Referring to FIG. 3, the pouch-type battery cell 110 includes an electrode assembly (not shown), a pair of electrode leads 111 and a cell case 112.

Although not shown in the drawings, the electrode assembly has a form in which separators are interposed between positive electrode plates and negative electrode plates that are repeatedly stacked alternately, and separators are preferably positioned at both outermost sides for insulation, respectively.

The positive electrode plate includes a positive electrode current collector and a positive electrode active material layer coated on one side of the positive electrode current collector, and a positive electrode uncoated region not coated with a positive electrode active material is formed at one side end of the positive electrode plate. The positive electrode uncoated region functions as a positive electrode tab.

The negative electrode plate includes a negative electrode current collector and a negative electrode active material layer coated on one surface or both sides of the negative electrode current collector, and a negative electrode uncoated region not coated with a negative electrode active material is formed at one side end of the negative electrode plate. The negative electrode uncoated region functions as a negative electrode tab.

In addition, the separator is interposed between the positive electrode plate and the negative electrode plate to prevent electrode plates having different polarities from directly contacting each other. The separator may be made of a porous material so that ions may be moved using the electrolyte as a medium between the positive electrode plate and the negative electrode plate.

The pair of electrode leads 111 are connected to the positive electrode tab (not shown) and the negative electrode tab (not shown), respectively, and are drawn out of the cell case 112. The pair of electrode leads 111 are drawn out at one longitudinal side and the other longitudinal side of the battery cell 110, respectively. That is, the battery cell 110 applied to the present disclosure corresponds to a bidirectional draw-out battery cell in which the positive electrode lead and the negative electrode lead are drawn in opposite directions.

In addition, the pair of electrode leads 111 are positioned to be biased to one side from a center of the battery cell 110 in a width direction (the Z-axis direction of FIG. 3). Specifically, the pair of electrode leads 111 are positioned to be biased to one side from the center of the battery cell 110 in the width direction, preferably to be biased downward along the height direction (the Z-axis direction of FIG. 2) of the cell stack 100.

If the pair of electrode leads 111 are positioned to be biased to one side from the center of the battery cell 110 in the width direction as described above, it is possible to give a space for installation of a connector 240 (see FIG. 5), explained later, and the outer terminal (see FIG. 1) so that the energy density of the battery module is improved. The increase in energy density due to the structure in which the electrode lead 111 is installed to be biased will be described in detail later.

The cell case 112 includes two regions, namely an accommodation portion accommodating the electrode assembly and a sealing portion extending in a circumferential direction of the accommodation portion and thermally fused in a state where the electrode lead 111 is drawn out to seal the cell case 112.

Although not shown in the figures, the cell case 112 is sealed by affixing and thermally fusing edge portions of an upper case and a lower case made of a multi-layered pouch film in which a resin layer, a metal layer and a resin layer are stacked in order.

In the sealing portion, a terrace portion 112a corresponding to a region located in the direction in which the electrode lead 111 is drawn out has a tapered shape such that both sides of the terrace portion 112a are cut so that the width thereof is gradually reduced along the drawing direction of the electrode lead 111. As described above, if the width of the terrace portion 112a is gradually reduced toward the outer side of the battery cell 110, the electrode lead 111 may be disposed to be biased, and the energy density of the battery module may be improved.

Meanwhile, the battery cell 110 applied to the present disclosure is a long cell where a ratio of length (L) to width (W) is about 3 or more and 12 or less. In the battery module according to the present disclosure, if the long cell type battery cell 110 is employed, it is possible to improve the capacity of the battery while minimizing the increase in the height of the battery module, which makes it easy to install the battery module at a lower part of a seat or a trunk of a vehicle.

Next, the FPCB assembly 200 will be described in detail with reference to FIGS. 5 to 7 along with FIG. 4.

Figure 5:
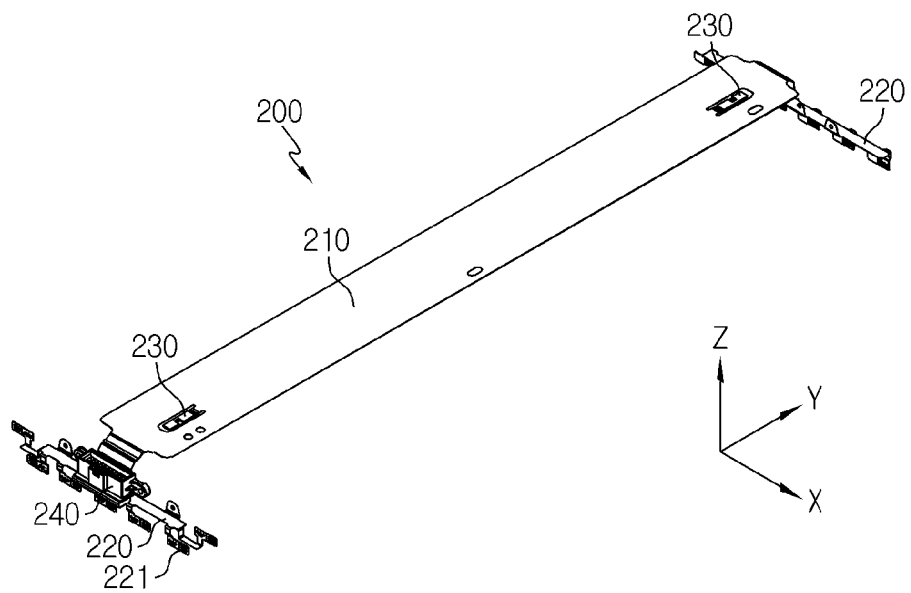
FIG. 5 is a perspective view showing a FPCB assembly applied to the battery module according to an embodiment of the present disclosure.
Figure 6:
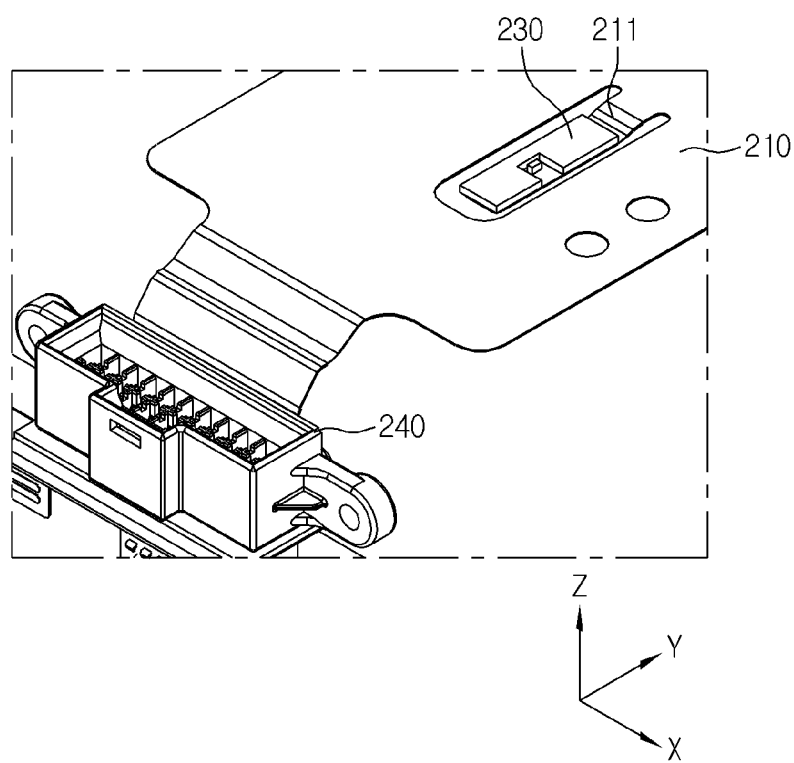
FIG. 6 is a partially enlarged view showing a portion of the FPCB assembly depicted in FIG. 5.
Figure 7:
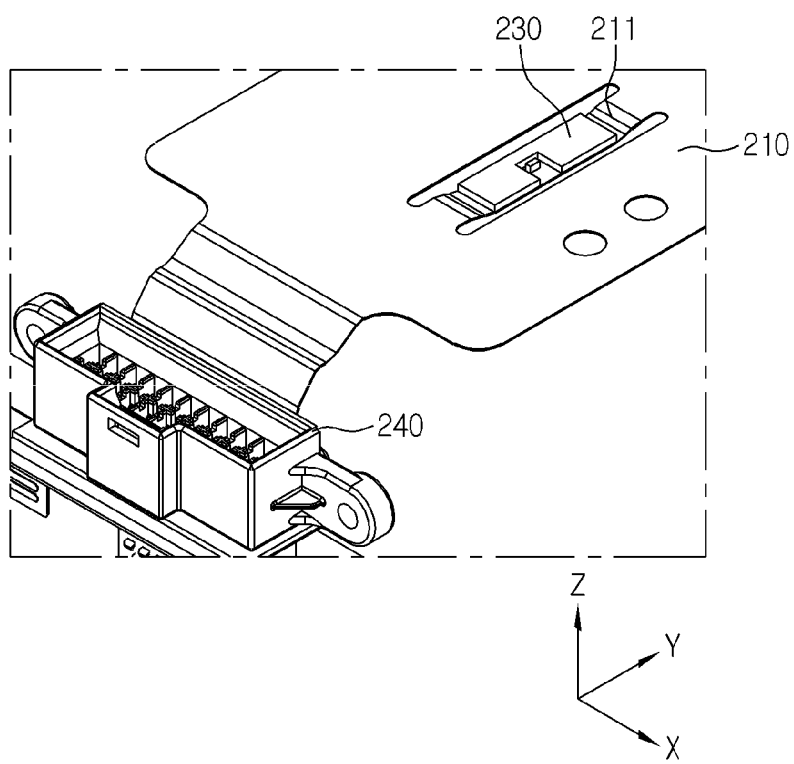
FIG. 7 is a diagram showing that the shape of the temperature sensor placing portion is partially modified in the structure of the FPCB assembly depicted in FIG. 6.

FIG. 5 is a perspective view showing a FPCB assembly applied to the battery module according to an embodiment of the present disclosure, FIG. 6 is a partially enlarged view showing a portion of the FPCB assembly depicted in FIG. 5, and FIG. 7 is a diagram showing that the shape of the temperature sensor placing portion is partially modified in the structure of the FPCB assembly depicted in FIG. 6.

Referring to FIGS. 4 to 7, the FPCB assembly 200 may be implemented to include a first FPCB 210, a second FPCB 220, a temperature sensor 230 and a connector 240. In the present disclosure, the first FPCB 210 and the second FPCB 220 are described as components distinguished from each other, but the first FPCB 210 and the second FPCB 220 may be a single integrated flexible printed circuit board (FPCB). That is, the first FPCB 210 and the second FPCB 220 are just elements that are distinguished according to positions where they are disposed.

The first FPCB 210 extends along the longitudinal direction of the cell stack 100 (the Y-axis direction of FIGS. 4 and 5) to cover at least a portion of the upper surface of the cell stack 100. Both longitudinal ends of the first FPCB 210 are provided with a temperature sensor placing portion 211 formed by cutting a portion of the first FPCB 210.

The temperature sensor 230 is mounted to the upper surface of the temperature sensor placing portion 211, whereby the temperature sensor 230 is installed at positions corresponding to both ends of the cell stack 100 in the longitudinal direction (the Y-axis of FIG. 4). In addition, the temperature sensor placing portion 211 is located at the center of the cell stack 100 in the width direction (the X-axis of FIG. 4). Accordingly, the temperature sensor 230 is installed at a position corresponding to the center of the cell stack 100 in the width direction.

The position where the temperature sensor placing portion 211 is formed is selected to sense a temperature of a portion with the highest temperature in the cell stack 100. The FPCB assembly 200 may be connected to a control device that may control charging and discharging of the battery module, such as a battery management system (BMS). If the temperature of the battery module rises above a reference value, in order to ensure safety in use of the battery module, it is preferable to measure the temperature at a location with the highest temperature to control charging and discharging.

Thus, in the longitudinal direction of the cell stack 100 (the Y-axis direction of FIG. 4), both longitudinal ends closest to the electrode lead 111 become optimal positions, and in the width direction of the cell stack 100 (the X-axis direction of FIG. 4), the center where heat dissipation is most difficult becomes an optimal position.

As shown in FIG. 6, the temperature sensor placing portion 211 is formed by cutting a part of the first FPCB 210, and one of both longitudinal ends of the temperature sensor placing portion 211 is formed as a fixed end and the other is formed as a free end. In addition, both widthwise ends of the temperature sensor placing portion 211 are formed as free ends by cutting.

By doing so, the temperature sensor placing portion 211 may move up and down freely despite the characteristics of the FPCB having a certain degree of stiffness. Accordingly, the temperature sensor 230 mounted to the temperature sensor placing portion 211 is indirectly adhered to the cell stack 100 through the temperature sensor placing portion 211, thereby accurately measuring the temperature of the cell stack 100.

Meanwhile, referring to FIG. 7, both widthwise ends of the temperature sensor placing portion 211 may be formed as free ends and both longitudinal ends thereof may be formed as fixed ends by cutting. If both longitudinal ends of the temperature sensor placing portion 211 are formed as fixed ends as above, as shown in FIG. 6, the risk of damage such as tearing of the temperature sensor placing portion 211 may be reduced compared to the case where only one longitudinal end is formed as a fixed end.

Next, the second FPCB 220 and the connector 240 applied to the present disclosure will be described in detail with reference to FIGS. 8 and 9 along with FIG. 5.

Figure 8:
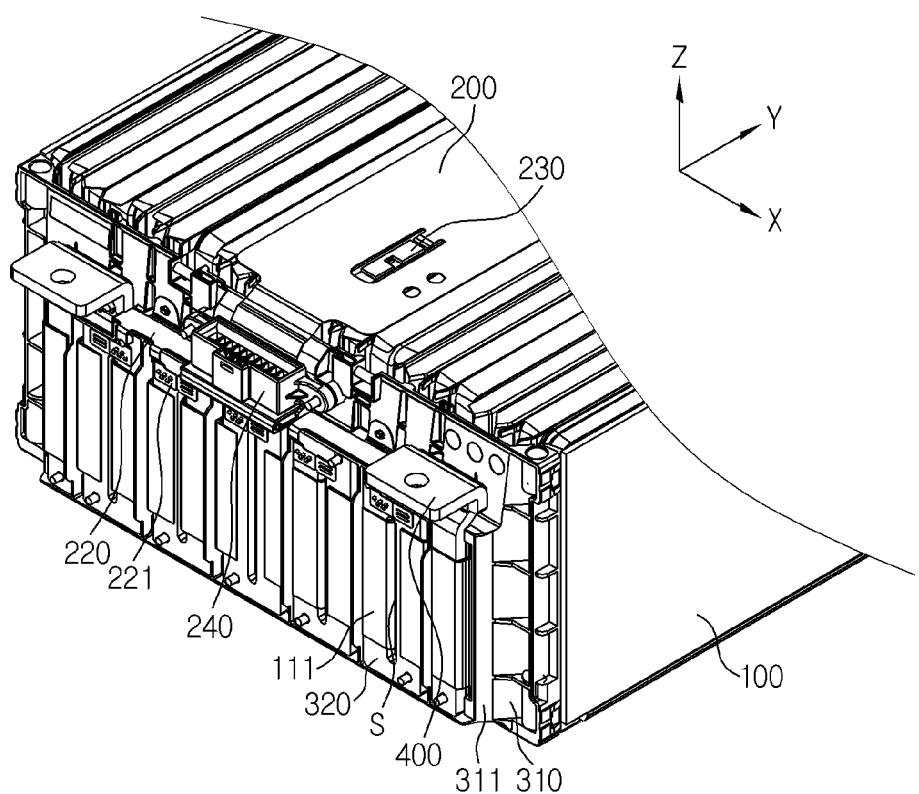
FIG. 8 is a partially enlarged view showing the battery module depicted in FIG. 1.
Figure 9:
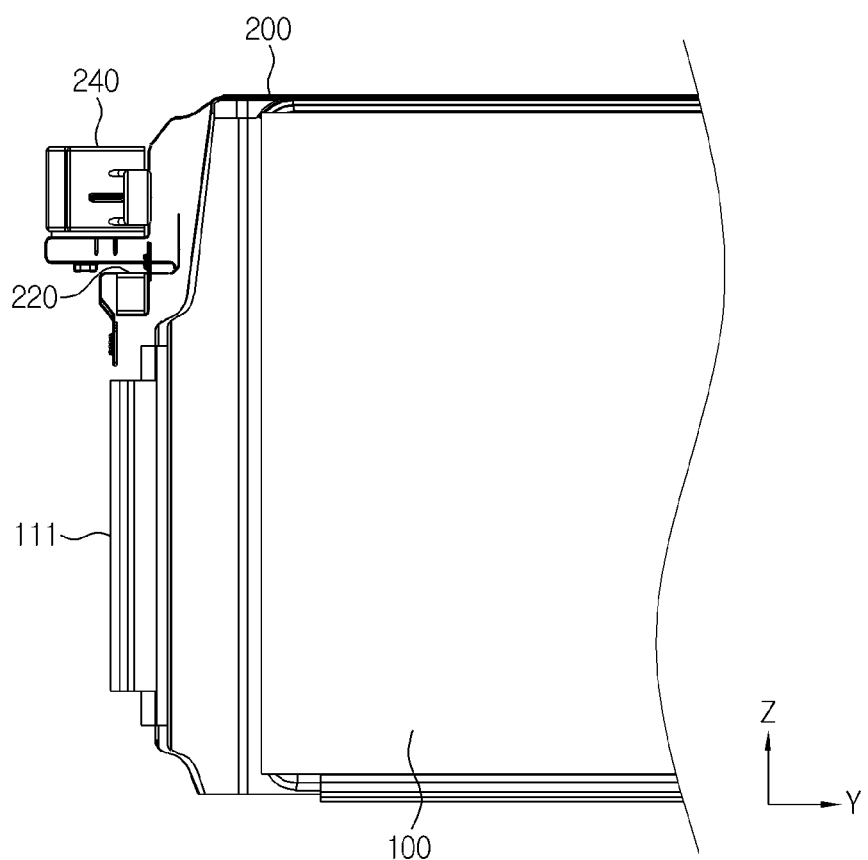
FIG. 9 is a diagram showing the battery module depicted in FIG. 8, observed from one side.

FIG. 8 is a partially enlarged view showing the battery module depicted in FIG. 1, and FIG. 9 is a diagram showing the battery module depicted in FIG. 8, observed from one side.

Referring to FIGS. 8 and 9 along with FIG. 5, the second FPCB 220 is provided in a pair, and the second FPCBs 220 extend from both longitudinal ends of the first FPCB 210 and are electrically connected to a bus bar 320, explained later, respectively. That is, the second FPCB 220 has a plurality of connection terminals 221 formed at several branched ends, and the plurality of connection terminals 221 are connected to a plurality of bus bar 320, explained later.

Meanwhile, the connector 240 is mounted on the second FPCB 220, and the connector 240 is electrically connected to the connection terminal 221 through the FPCB. As described above, a control device (not shown) such as BMS is connected to the connector 240, and the control device receives information about a voltage of the battery cell 110 measured through the bus bar 320 and the connection terminal 221, information about a temperature of the cell stack 100 measured through the temperature sensor 230, or the like, and controls charging and discharging of the battery module with reference to the information.

Meanwhile, as shown in FIG. 8, the connector 240 mounted on the second FPCB 220 faces a front surface (a surface parallel to the X-Z plane of FIGS. 8 and 9) of the cell stack 100 but is installed in a space formed above the electrode lead 111 due to biasing of the electrode lead 111. That is, the connector 240 is installed to face an upper portion of the front surface of the cell stack 100.

As such, the connector 240 is installed in the space provided due to the structure in which the electrode lead 111 is installed to be biased, which minimizes the overall volume increase of the battery module caused by the installation of the connector 240, thereby improving energy density.

Subsequently, the bus bar frame assembly 300 and the outer terminal 400 applied to the present disclosure will be described in detail with reference to FIG. 8.

Referring to FIG. 8, the bus bar frame assembly 300 may be implemented to include a bus bar frame 310 configured to cover one longitudinal end and the other longitudinal end of the cell stack 100 and a plurality of bus bars 320 fixed on the bus bar frame 310 and electrically connected to the battery cells 110.

The bus bar frame 310, for example, may be made of an insulating material such as resin, and includes a bus bar placing portion 311 formed to protrude at a position corresponding to electrode leads 111 of the battery cell 110. The bus bar placing portion 311 is formed at a position biased downward from the center of the cell stack 100 in the height direction (the Z-axis direction of FIG. 8), like the electrode lead 111. The biasing of the bus bar placing portion 311 is to secure a space for installing components, similar to the biasing of the electrode lead 111.

The bus bar placing portion 311 has a plurality of lead slits S formed at positions corresponding to the electrode leads 111. Through the lead slits S, the electrode leads 111 are drawn out of the bus bar frame assembly 300, and the drawn electrode leads 111 are bent and fixed by welding or the like on the bus bar 320.

The outer terminal 400 is provided in a pair, and the outer terminals 400 are respectively connected to the bus bars 320 located at outsides of the both sides of the cell stack 100 in the width direction (the X-axis direction of FIG. 8).

Like the connector 240 described above, the outer terminal 400 is located in the space formed above the electrode lead 111 and the bus bar placing portion 311 due to the biasing of the electrode lead 111. The location where the outer terminal 400 is formed may minimize the volume of the battery module increased by installing the outer terminal 400 since it utilizes the space formed by the biased installation of the electrode lead 111.

Next, the upper cover 500 will be described with reference to FIGS. 1 and 8.

Referring to FIGS. 1 and 8, the upper cover 500 corresponds to a component that covers an upper surface of the cell stack 100 (a surface parallel to the X-Y plane of FIGS. 1 and 8) and the first FPCB 210. The upper cover 500 is hinged to the pair of bus bar frames 310, respectively, and a gap is formed at a location corresponding to the connection portion of the first FPCB 210 and the second FPCB 220, so that the connection portion of the first FPCB 210 and the second FPCB 220 is drawn out of the upper cover 500 through the gap.

As described above, in the battery module according to the present disclosure, a long cell is applied as each of the battery cells 110 included in the cell stack 100, and accordingly, the temperature deviation tends that to be large along the longitudinal direction of the cell stack 100.

In the battery module according to the present disclosure, in consideration of the temperature deviation, the temperature sensors 230 are installed at both longitudinal ends of the cell stack 100 to allow effective temperature sensing. In addition, in the battery module according to the present disclosure, the adhesion between the temperature sensor 230 and the cell stack 100 is maximized by providing the temperature sensor placing portions 211 formed by cutting a part of the first FPCB 210 so that the temperature sensor 230 is placed on the temperature sensor placing portions 211.

Moreover, in the battery module according to the present disclosure, the connector 240 and the outer terminal 400 are installed using the space formed above the electrode lead 111 due to biasing of the electrode lead 111, thereby minimizing the increase in volume of the battery module caused by the installation of components and thus improving the energy density.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
   a cell stack formed by stacking a plurality of battery cells;
   a bus bar frame assembly including a bus bar frame configured to cover a first longitudinal end and a second longitudinal end of the cell stack and a plurality of bus bars fixed on the bus bar frame and electrically connected to the battery cells;
   a flexible printed circuit board (FPCB) assembly including a first FPCB extending along a longitudinal direction of the cell stack to cover at least a portion of an upper surface of the cell stack, the first FPCB having a pair of side edges extending in the longitudinal direction of the cell stack, and a second FPCB extending from both longitudinal ends of the first FPCB and electrically connected to the plurality of bus bars, and a pair of apertures formed in the first FPCB between the pair of side edges of the first FPCB;
   a pair of sensor placing portions extending into a respective one of the pair of apertures, each sensor placing portion having a first end fixed to the first FPCB and a pair of sides separated from the first FPCB; and
   a pair of temperature sensors mounted to a top surface of the respective sensor placing portion.

2. The battery module according to claim 1, wherein the battery cell has a ratio of length to width in a range of 3 to 12.

3. The battery module according to claim 1, wherein a second longitudinal end of each sensor placing portions is formed as a free end.

4. The battery module according to claim 1, wherein a second longitudinal end of the sensor placing portion is a fixed end.

5. The battery module according claim 1, further comprising:
   an upper cover configured to cover an upper portion of the cell stack and the first FPCB.

6. The battery module according to claim 5, wherein a connection portion of the first FPCB and the second FPCB are drawn out through a gap between the bus bar frame and the upper cover.

7. The battery module according to claim 1, wherein the battery cell includes:
- an electrode assembly;
- a pair of electrode leads connected to the electrode assembly and extending in opposite directions along a longitudinal direction of the battery cell; and
- a cell case configured to accommodate the electrode assembly and sealed to expose the pair of electrode leads to the outside.

8. The battery module according to claim 7, wherein the pair of electrode leads are formed at locations biased downward from a center of the cell stack in a height direction.

9. The battery module according to claim 8, further comprising:
- a connector mounted to the second FPCB and positioned in a space formed above the electrode lead due to biasing of the electrode lead.

10. A battery pack, comprising the battery module according to claim 1.

11. A vehicle, comprising the battery module according to claim 1.

12. The battery module according to claim 7, wherein the pair of temperature sensors are in a middle in a width direction of the cell stack.

13. The battery module according to claim 1, wherein the pair of temperature sensors extend in the longitudinal direction.

14. The battery module according to claim 1, wherein a second end of each sensor placing portion is fixed to the first FPCB.

* * * * *